US012574712B2

(12) United States Patent 
Lee et al.

(10) Patent No.: US 12,574,712 B2 
(45) Date of Patent: Mar. 10, 2026

(54) SERVICE PROVIDING SERVER AND METHOD

(71) Applicants:HYUNDAI MOTOR COMPANY, Seoul (KR); KIA CORPORATION, Seoul (KR)

(72) Inventors: Dae Kun Lee, Yongin-si (KR); Han Shik Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 70 days.

(21) Appl. No.: 18/612,336

(22) Filed: Mar. 21, 2024

(65) Prior Publication Data

US 2025/0159445 A1 May 15, 2025

(30) Foreign Application Priority Data

Nov. 9, 2023 (KR) ........................ 10-2023-0154629

(51) Int. Cl.
*G01C 21/36* (2006.01)
*G01C 21/34* (2006.01)
*H04W 4/46* (2018.01)

(52) U.S. Cl.
CPC .......... *H04W 4/46* (2018.02); *G01C 21/3438* (2013.01); *G01C 21/3614* (2013.01); *G01C 21/3679* (2013.01); *G01C 21/3697* (2013.01)

(58) Field of Classification Search
CPC ........... G01C 21/3679; G01C 21/3614; G01C 21/3697; G01C 21/3438; H04W 4/46
See application file for complete search history.

(56) References Cited

U.S. PATENT DOCUMENTS

| | | | | |
|---|---|---|---|---|
| 2014/0278027 A1* | 9/2014 | Burke | ...................... | G08G 1/22 |
| | | | | 701/117 |
| 2017/0248433 A1* | 8/2017 | Mahajan | .......... | G08G 1/096883 |
| 2017/0284818 A1* | 10/2017 | Boss | ....................... | H04W 4/08 |
| 2021/0235242 A1* | 7/2021 | Shin | ..................... | G05D 1/0285 |
| 2021/0333115 A1* | 10/2021 | Deselaers | .............. | G08G 1/143 |
| 2023/0324184 A1* | 10/2023 | Wang | ..................... | H04W 4/40 |
| | | | | 701/533 |
| 2024/0152949 A1* | 5/2024 | Bahnsen | ............ | G01C 21/3438 |

FOREIGN PATENT DOCUMENTS

| | | | | | |
|---|---|---|---|---|---|
| KR | 101985496 B1 | * | 6/2019 | ........... | B60W 40/10 |
| KR | 20240097393 A | * | 6/2024 | ............. | G06Q 50/40 |
| WO | WO-2018114216 A1 | * | 6/2018 | ......... | G06Q 30/0639 |

OTHER PUBLICATIONS

Machine Translation of WO 2018/114216 A1 (Bergmann) by EPO. (Year: 2018).*

* cited by examiner

*Primary Examiner* — Dino Kujundzic

(74) *Attorney, Agent, or Firm* — Lempia Summerfield Katz LLC

(57) ABSTRACT

A service providing server includes a sharing unit configured to, when a group driving function of traveling while sharing a destination or a current location is enabled in multiple vehicles, share, between the multiple vehicles, information on at least some of recommended places displayed on a respective display device provided in each of the multiple vehicles. The service providing server also includes an execution unit configured to, based on the shared information, select a recommended place and provide an additional service for the selected recommended place.

17 Claims, 3 Drawing Sheets

FIG. 3 start

*S310* has group driving function been enabled?

Figure 3:
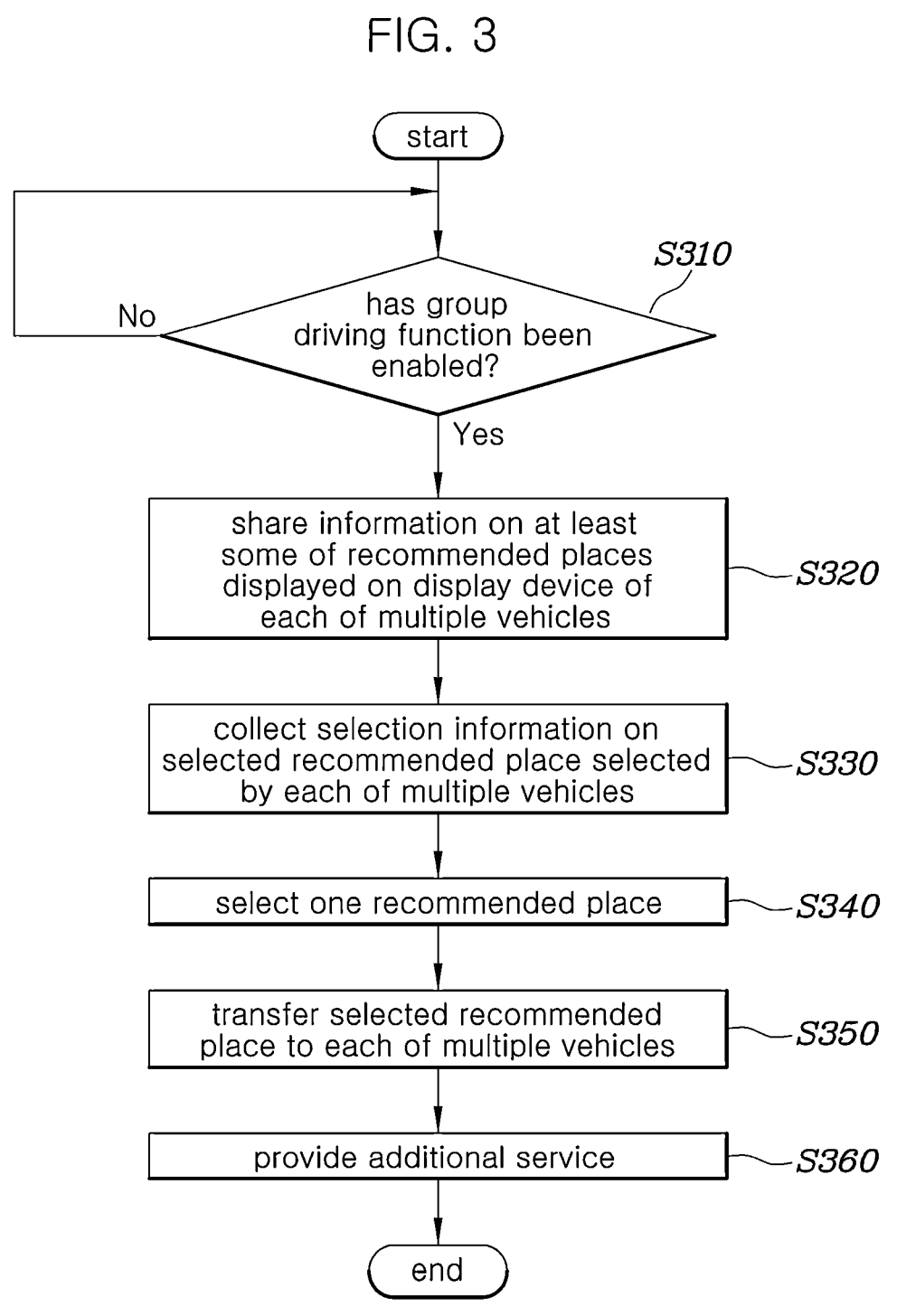

No

Yes share information on at least some of recommended places displayed on display device of each of multiple vehicles — *S320* collect selection information on selected recommended place selected by each of multiple vehicles — *S330* select one recommended place — *S340* transfer selected recommended place to each of multiple vehicles — *S350* provide additional service — *S360* end

SERVICE PROVIDING SERVER AND METHOD

CROSS-REFERENCE TO RELATED APPLICATION(S)

This application claims the benefit of and priority to Korean Patent Application No. 10-2023-0154629, filed on Nov. 9, 2023, the entire contents of which are incorporated herein by reference.

TECHNICAL FIELD

The present disclosure relates to a service providing server and method for providing a service to a user of a vehicle.

BACKGROUND

A conventional navigation device mounted on a vehicle shows a current location and a traveling direction of the vehicle via a display unit by using data received from a global positioning system (GPS) satellite, and provides a road, a distance, and an estimated time for the vehicle to travel by displaying the same on a screen when a departure point and a destination are input.

In addition, a navigation device receives real-time traffic information and preconfigures an optimal distance or road priority by using the received traffic information, a current location of a vehicle, and internally stored map information. The navigation device provides a service for, when a user searches for a route, providing information on the searched route, based on the preconfigured data. However, a navigation device may provide a user with various functions, such as a radio function, a media function, and a location sharing function, as well as route guidance.

The above information described in this Background section is intended merely to aid in the understanding of the background of the present disclosure, and is not intended to mean that the information falls within the purview of the related art already known to those having ordinary skill in the art.

SUMMARY

As time that a user spends in a vehicle increases, it may be desirable to provide a function or a service enabling increase of user convenience by using a navigation device.

The present disclosure has been made to achieve such in view of the foregoing. An object of the present disclosure is to provide a service providing server and method capable of improving convenience of a vehicle user.

The technical objects of the present disclosure are not limited to the above-mentioned technical objects. Other technical subjects that are not mentioned should be readily understood by those having ordinary skill in the art to which the present disclosure pertains from the following description.

According to an embodiment, a service providing server is provided. The service providing server includes a sharing unit configured to, when a group driving function of traveling while sharing a destination or a current location is enabled in multiple vehicles, share, between the multiple vehicles, information on at least some of recommended places displayed on a respective display device provided in each of the multiple vehicles. The service providing server also includes an execution unit configured to, based on the shared information, select a recommended place and provide an additional service for the selected recommended place.

In an aspect, the selected recommended place may be displayed on the respective display device for each of the multiple vehicles, based on at least one of a vehicle location or preference of a vehicle user.

In an aspect, the execution unit may be configured to, based on the shared information, collect selection information on one recommended place selected in each of the multiple vehicles. The execution unit may also be configured to select the recommended place based on the collected selection information by selecting, as the recommended place, one recommended place selected in a number of vehicles among the multiple vehicles.

In an aspect, the execution unit may be further configured to, when the recommended place is selected, transfer information on the selected recommended place to each of the multiple vehicles.

In an aspect, the information transferred to each of the multiple vehicles may include at least one of location information or brand information for the selected recommended place.

In an aspect, the execution unit may be further configured to perform control so that, in each of the multiple vehicles, the selected recommended place is configured as a destination, or, when there is a preconfigured destination, the selected recommended place is configured as a waypoint.

In an aspect, the execution unit may be further configured to provide information on an additional service used by one vehicle among the multiple vehicles to remaining vehicles among the multiple vehicles.

In an aspect, the execution unit may be configured to, while providing the additional service to each of the multiple vehicles, control information on the additional service to be output visually or audibly in each of the multiple vehicles.

In an aspect, the execution unit may be configured to control the information on the additional service to be output via the respective display device provided in each of the multiple vehicles.

In an aspect, the additional service may include at least one of a menu notification service related to the selected recommended place, an order service related to the selected recommended place, or a payment service related to the selected recommended place.

In an aspect, the execution unit may be configured to, when the multiple vehicles use the payment service, control payment information, related to an in-vehicle payment function associated with the payment service, to be transmitted from at least one vehicle equipped with the in-vehicle payment function among the multiple vehicles to remaining vehicles among the multiple vehicles.

In another embodiment, a service providing method is provided. The service providing method includes, when a group driving function of traveling while sharing a destination or a current location is enabled in multiple vehicles, sharing, between the multiple vehicles, information on at least some of recommended places displayed on a respective display device provided in each of the multiple vehicles. The service providing method also includes, based on the shared information, selecting a recommended place and providing an additional service for the selected recommended place.

In an aspect, selecting the recommended place may include, based on the shared information, collecting selection information on one recommended place selected in each of the multiple vehicles. Selecting the recommended place may also include, based on the collected selection information, selecting, as the recommended place, one recommended place selected in a number of vehicles among the multiple vehicles.

In an aspect, the service providing method may further include, when the one recommended place is selected, transferring information on the selected recommended place to each of the multiple vehicles.

In an aspect, the service providing method may further include performing control so that, in each of the multiple vehicles, the selected recommended place is configured as a destination, or, when there is a preconfigured destination, the selected recommended place is configured as a waypoint.

In an aspect, providing the additional service may include providing information on an additional service used by one vehicle among the multiple vehicles to remaining vehicles among the multiple vehicles.

In an aspect, the service providing method may further include, while providing the additional service to each of the multiple vehicles, controlling information on the additional service to be output visually or audibly in each of the multiple vehicles.

In an aspect, controlling the information on the additional service to be output may include controlling the information on the additional service to be output via the respective display device provided in each of the multiple vehicles.

In an aspect, providing the additional service may include, when the multiple vehicles use a payment service included in the additional service, controlling payment information, related to an in-vehicle payment function associated with the payment service, to be transmitted from at least one vehicle equipped with the in-vehicle payment function among the multiple vehicles to remaining vehicles among the multiple vehicles.

According to embodiments, via the service providing server and method of the present disclosure, information is shared between multiple vehicles in group driving, so that a vehicle user can easily share information related to his/her own vehicle with other vehicles, thereby improving convenience for the vehicle user.

Additionally, by linking to an in-vehicle payment function, use of the in-vehicle payment function can be encouraged to improve user convenience.

In addition, when one place is selected via multiple vehicles in group driving, an additional service for the place is also provided, so that, during driving, a vehicle user can use the service while concentrating on driving without using a separate cell phone, thereby improving convenience and safety of the vehicle driver.

Advantageous effects of the present disclosure are limited to the above-mentioned effects. Other advantageous effects that are not mentioned should be readily understood by those having ordinary skill in the art to which the present disclosure pertains from the following description.

BRIEF DESCRIPTION OF THE DRAWINGS

The above and other aspects, features, and advantages of the present disclosure should be more apparent from the following detailed description taken in conjunction with the accompanying drawings, in which:

FIG. 3 is a flowchart for describing a service providing method, according to an embodiment of the present disclosure.

DETAILED DESCRIPTION

Figure 1:
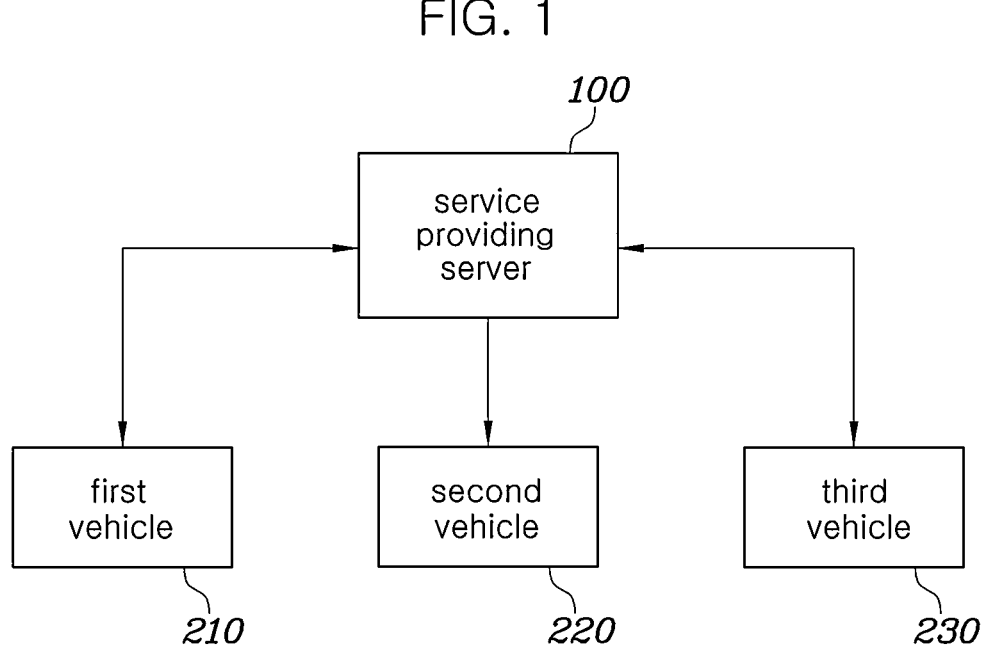
FIG. 1 and FIG. 2 are block diagrams for describing a service providing server, according to an embodiment of the present disclosure.

In describing embodiments of the present disclosure, where it has been determined that a detailed description of the relevant known technology may unnecessarily obscure the gist of the present disclosure, the detailed description thereof has been omitted. Furthermore, the accompanying drawings are provided only to enhance understanding of the embodiments disclosed in the present specification. The technical spirit disclosed herein is not limited to the accompanying drawings. It should be understood that all changes, equivalents, and substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expressions such as "include" and "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

When a component, device, element, or the like of the present disclosure is described as having a purpose or performing an operation, function, or the like, the component, device, or element should be considered herein as being "configured to" meet that purpose or to perform that operation or function. The term "unit" or "module" used in the present disclosure signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

Hereinafter, embodiments of the present specification are described in detail with reference to the accompanying drawings. In the following description, the same or similar elements are given the same or similar reference numerals, and duplicate descriptions thereof are omitted.

An objective of the present disclosure is to provide a service capable of increasing convenience of a user using a vehicle. In an embodiment of the present disclosure described below, the objective is achieved with respect to multiple vehicles performing group driving.

First, a service providing system according to an embodiment of the disclosure is described with reference to FIGS. 1 and 2.

Figure 2:
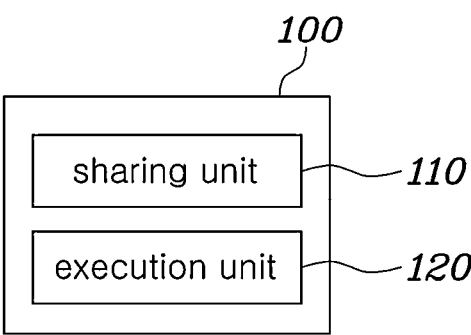

FIGS. 1 and 2 are block diagrams for describing a service providing system, according to an embodiment of the present disclosure.

Referring first to FIG. 1, a service providing server 100 according to an embodiment of the present disclosure may be provided to enable mutual communication with multiple vehicles 210, 220, and 230. Accordingly, the service providing server 100 may transmit/receive information to/from each of the multiple vehicles 210, 220, and 230. The service providing server 100 may provide information required by each of the multiple vehicles 210, 220, and 230 at an appropriate time, and may collect and manage information received from the multiple vehicles 210, 220, and 230.

For example, the service providing server 100 according to an embodiment of the present disclosure may refer to a vehicle server equipped to enable mutual communication with the multiple vehicles 210, 220, and 230, thereby providing various services to each of the multiple vehicles 210, 220, and 230. This is merely an example, and the present disclosure is not limited thereto.

Each of the multiple vehicles 210, 220, and 230 and the service providing server 100 may include a communication device configured to communicate with another device (e.g., a controller or a sensor) to perform operations, functions, etc. Each of the multiple vehicles 210, 220, and 230 and the service providing server 100 may also include a memory configured to store an operating system, logic instructions, input/output information, etc., and one or more processors configured to perform judgment, calculation, determination, etc. required to perform operations, functions, etc.

Hereinafter, in the service providing server 100 according to an embodiment of the present disclosure, for a function to be performed with respect to the multiple vehicles 210, 220, and 230, an assumption is made for a situation where a group driving function of traveling while sharing a destination and a current location is enabled and the multiple vehicles 210, 220, and 230 are traveling together.

Specific functions of the service providing server 100, according to embodiments, are described below with reference to FIG. 2.

Referring to FIG. 2, the service providing server 100 according to an embodiment of the present disclosure may include a sharing unit 110 and an execution unit 120. FIG. 2 mainly illustrates elements associated with an embodiment of the present disclosure, and may actually include fewer or more elements than the illustrated elements.

Hereinafter, respective elements are described.

When a group driving function of traveling while sharing a destination or a current location is enabled in the multiple vehicles 210, 220, and 230, the sharing unit 110 may share, between the multiple vehicles 210, 220, and 230, information on at least some of recommended places displayed on a respective display device provided in each of the multiple vehicles 210, 220, and 230.

For example, recommended place information may be preconfigured for each of the multiple vehicles 210, 220, and 230, based on at least one of a vehicle user's preference and a location of each vehicle. The preconfigured recommended place information may be visually displayed via the display device provided in each of the multiple vehicles 210, 220, and 230. The display device provided in each of the multiple vehicles 210, 220, and 230 may be implemented as a display of an audio/video/navigation (AVN) system, a head-up display (HUD), a cluster of the vehicle, etc. However, this is an example, and the present disclosure is not limited thereto. Rather, various devices other than the devices described above may be used in other embodiments.

The user's preference and the location of each of the multiple vehicles 210, 220, and 230 may be partially different. Therefore, the recommended place information displayed on the display device of each vehicle may also be partially different.

Accordingly, when the group driving function is enabled in the multiple vehicles 210, 220, and 230, the sharing 110 may, in order to minimize at least partially different recommended place information for each of the multiple vehicles 210, 220, and 230, share, between the multiple vehicles 210, 220, and 230, information on at least some of recommended places displayed on the display device provided in each of the multiple vehicles 210, 220, and 230.

For example, the sharing unit 110 may collect, from one vehicle 210 among the multiple vehicles 210, 220, and 230, recommended place information displayed on a display device of the corresponding vehicle 210, and transfer the collected information to the vehicles 220 and 230 other than the corresponding vehicle 210. This may be performed in the same manner with respect to the multiple vehicles 210, 220, and 230. This is merely an example, and the present disclosure is not limited thereto. For example, the sharing unit 110 may receive recommended place information from each of the multiple vehicles 210, 220, and 230, and may integrate each piece of the received recommended place information within the sharing unit 110 to transfer the integrated recommended place information back to the multiple vehicles 210, 220, and 230.

When sharing of the information on at least some of the recommended places between the multiple vehicles 210, 220, and 230 is completed, the recommended places may be displayed equally for the multiple vehicles 210, 220, and 230 on the display device provided in each of the multiple vehicles 210, 220, and 230. In addition, the user of each of the multiple vehicles 210, 220, and 230 may select, based on the information shared between the multiple vehicles 210, 220, and 230, one place among the recommended places displayed on the display device.

The execution unit 120 may collect selection information for one place selected in each of the multiple vehicles 210, 220, and 230. The execution unit 120 may select, based on the collected selection information, one recommended place selected in a large number (e.g., more than a predetermined threshold number, more than half, etc.) of vehicles among the multiple vehicles 210, 220, and 230.

The recommended places selected by the multiple vehicles 210, 220, and 230 may be different from each other. In this case, if multiple pieces of information selected by the respective multiple vehicles 210, 220, and 230 are provided to each vehicle, confusion may occur to the vehicle user due to information overload. Therefore, in order to prevent such confusion to the vehicle user, the execution unit 120 may collect selection information selected in each of the multiple vehicles 210, 220, and 230, and may select one recommended place selected in a large number (e.g., more than a predetermined threshold number, more than half, etc.) of vehicles so as to provide only one piece of information to the vehicle user, thereby preventing confusion of the user.

In addition, when one recommended place is selected, the execution unit 120 may transfer information on the selected recommended place to each of the multiple vehicles 210, 220, and 230. Accordingly, in the multiple vehicles 210, 220, and 230, users may identify information on only one selected recommended place.

In an embodiment, the information on the selected recommended place, that is transferred to each of the multiple vehicles 210, 220, and 230 via the execution unit 120, may include at least one of location information or brand information for the selected recommended place. This is merely an example, and the present disclosure is not limited thereto.

The execution unit 120 may transfer the information on the selected recommended place to each of the multiple vehicles 210, 220, and 230, and may concurrently be involved in a function related to traveling of each of the multiple vehicles 210, 220, and 230. For example, the execution unit 120 may control a travel route of each of the multiple vehicles 210, 220, and 230 to be changed based on the information on the selected recommended place. As an example, the execution unit 120 may control the selected recommended place to be configured as a destination in each of the multiple vehicles 210, 220, and 230, or, when there is a preconfigured destination, the execution unit 120 may control the selected recommended place to be configured as a waypoint.

Accordingly, the multiple vehicles 210, 220, and 230 in which the group driving function may be enabled may travel toward the same destination or the same waypoint.

In addition, the execution unit 120 according to an embodiment of the present disclosure may provide an additional service for the selected recommended place. The additional service may include at least one of a menu notification service related to the selected recommended place, an order service related to the selected recommended place, and/or a payment service related to the selected recommended place. However, this is an example, and the present disclosure is not limited thereto. For example, the additional service may include one or more services in addition to, or instead of, one or more of the above-mentioned services.

The execution unit 120 may provide the additional service for the selected recommended place to each of the multiple vehicles 210, 220, and 230. For example, the execution unit 120 may first provide the additional service to one vehicle among the multiple vehicles 210, 220, and 230, and may recollect information on the additional service used by the one vehicle to which the additional service has first been provided. The execution unit 120 may provide the information on the additional service used by the one vehicle to vehicles other than the one vehicle. As a result, the same service may be provided to the user of each of the multiple vehicles 210, 220, and 230 in which the group driving function has been enabled.

In addition, while providing the additional service to each of the multiple vehicles 210, 220, and 230, the execution unit 120 may control information on the additional service to be output visually or audibly from the multiple vehicles 210, 220, and 230. For example, while providing the additional service to each of the multiple vehicles 210, 220, and 230, the execution unit 120 may control the information on the additional service to be output via the display device provided to each of the multiple vehicles 210, 220, and 230.

For example, when the additional service is a menu notification service, menu information related to one selected recommended place may be output on the display device of each of the multiple vehicles 210, 220, and 230.

As another example, when the additional service is an order service, order information related to one selected recommended place may be output on the display device of each of the multiple vehicles 210, 220, and 230, wherein order information of another vehicle may also be output.

As yet another example, when the additional service is a payment service, payment information related to one selected recommended place may be output on the display device of each of the multiple vehicles 210, 220, and 230.

This is merely an example, and the present disclosure is not limited thereto.

In an embodiment, when the multiple vehicles 210, 220, and 230 use the payment service among additional services, the execution unit 120 may control payment information, related to an in-vehicle payment function associated with the payment service, to be transmitted from at least one vehicle equipped with the in-vehicle payment function among the multiple vehicles 210, 220, and 230 to the remaining vehicles. For example, a payment personal identification (PIN) number may be transmitted from the at least one vehicle equipped with the in-vehicle payment function to the remaining vehicles, so that the remaining vehicles may smoothly use the payment service. A vehicle receiving the payment information may or may not be equipped with the in-vehicle payment function. If the vehicle receiving the payment information is equipped with the in-vehicle payment function, the vehicle may conveniently use the payment service. Further, it is not the case that the payment service cannot be used because the in-vehicle payment function is not provided in the vehicle.

The in-vehicle payment function may refer to a payment function that allows convenient payment without a physical card at an affiliated store, such as a gas station, a car wash, a restaurant, and a parking lot, via a navigation system installed in a vehicle. For example, the in-vehicle payment function provided in the vehicle may be an in-car-payment function, but the disclosure is certainly not limited thereto.

The execution unit 120 may provide the additional service for the recommended place selected in each of the multiple vehicles 210, 220, and 230, thereby enabling the user of each of the multiple vehicles 210, 220, and 230 to conveniently use the additional service while driving.

Hereinafter, based on the service providing system described above in FIGS. 1 and 2, a service providing method according to an embodiment is described below with reference to FIG. 3. Detailed descriptions of respective operations that have been provided in detail with reference to FIGS. 1 and 2 have been omitted from the description below for the purpose of conciseness.

FIG. 3 is a flowchart for describing the service providing method according to an embodiment of the present disclosure.

Referring to FIG. 3, in an operation S310, the sharing unit 110 may identify whether a group driving function is enabled in the multiple vehicles 210, 220, and 230. When the group driving function is enabled (Yes in the operation S310), the sharing unit 110 may, in an operation S320, share, between the multiple vehicles 210, 220, and 230, information on at least some of recommended places displayed on the display device provided in each of the multiple vehicles 210, 220, and 230.

When the information is shared between the multiple vehicles 210, 220, and 230, the execution unit 120 may, in an operation S330, collect selection information for one recommended place selected in each of the multiple vehicles 210, 220, and 230. In an operations S340, the execution unit 120 may select, based on the collected selection information, one recommended place selected in a large number (e.g., more than a predetermined threshold number, more than half, etc.) of vehicles among the multiple vehicles 210, 220, and 230.

In an operation S350, the execution unit 120 may transfer information on the one selected recommended place to each of the multiple vehicles 210, 220, and 230. In an operation S360, the execution unit 120 may provide an additional service for the one selected recommended place.

According to embodiments of the present disclosure, via the service providing system and method of the disclosure, information is shared between multiple vehicles in group driving, so that a vehicle user can easily share information related to his/her own vehicle with other vehicles, thereby improving convenience for the vehicle user.

Additionally, by linking to the in-vehicle payment function, use of the in-vehicle payment function can be encouraged to improve user convenience.

In addition, when one place is selected via multiple vehicles in group driving, an additional service for the place is also provided, so that, during driving, a vehicle user can use the service while concentrating on driving without using a separate cell phone, thereby improving convenience and safety of the vehicle driver.

Although the present disclosure has been described and illustrated in conjunction with example embodiments thereof, it should be apparent to those having ordinary skill in the art that various improvements and modifications may be made to the described embodiments without departing from the technical idea of the present disclosure defined by the appended claims.

Embodiments of the present disclosure may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. Furthermore, the above detailed description should not be construed in a limitative sense, but should be considered in an illustrative sense in all aspects. The scope of the present disclosure should be determined by reasonable interpretation of the appended claims, and all changes and modifications within the equivalent scope should be construed as being included within the scope of the present disclosure.

What is claimed is:

1. A service providing server, comprising:
a memory configured to store computer-readable instructions; and
a processor configured to execute the computer-readable instructions, wherein the processor is configured to
when a group driving function of traveling while sharing a destination or a current location is enabled in multiple vehicles, share, between the multiple vehicles, information on at least some of recommended places displayed on a respective display device provided in each of the multiple vehicles,
select, based on the shared information, a recommended place,
provide an additional service for the selected recommended place, and
provide information on the additional service used by one vehicle among the multiple vehicles to remaining vehicles among the multiple vehicles.

2. The service providing server of claim 1, wherein the selected recommended place is displayed on the respective display device for each of the multiple vehicles, based on at least one of a vehicle location or preference of a vehicle user.

3. The service providing server of claim 1, wherein the processor is configured to:
based on the shared information, collect selection information on one recommended place selected in each of the multiple vehicles, and
select the recommended place based on the collected selection information by selecting, as the recommend place, one recommended place selected in a number of vehicles among the multiple vehicles.

4. The service providing server of claim 1, wherein the processor is further configured to, when the recommended place is selected, transfer information on the selected recommended place to each of the multiple vehicles.

5. The service providing server of claim 4, wherein the information transferred to each of the multiple vehicles includes at least one of location information or brand information for the selected recommended place.

6. The service providing server of claim 4, wherein the processor is further configured to control the selected recommended place to be configured as a destination in each of the multiple vehicles, or, when there is a preconfigured destination, control the selected recommended place to be configured as a waypoint.

7. The service providing server of claim 1, wherein the processor is configured to, while providing the additional service to each of the multiple vehicles, control information on the additional service to be output visually or audibly in each of the multiple vehicles.

8. The service providing server of claim 7, wherein the processor is configured to control the information on the additional service to be output via the respective display device provided in each of the multiple vehicles.

9. The service providing server of claim 1, wherein the additional service comprises at least one of a menu notification service related to the selected recommended place, an order service related to the selected recommended place, or a payment service related to the selected recommended place.

10. The service providing server of claim 9, wherein the processor is configured to, when the multiple vehicles use the payment service, control payment information, related to an in-vehicle payment function associated with the payment service, to be transmitted from at least one vehicle equipped with the in-vehicle payment function among the multiple vehicles to remaining vehicles among the multiple vehicles.

11. A service providing method, comprising:
when a group driving function of traveling while sharing a destination or a current location is enabled in multiple vehicles, sharing, between the multiple vehicles, information on at least some of recommended places displayed on a respective display device provided in each of the multiple vehicles;
based on the shared information, selecting a recommended place and providing an additional service for the selected recommended place; and
providing information on the additional service used by one vehicle among the multiple vehicles to remaining vehicles among the multiple vehicles.

12. The method of claim 11, wherein selecting the recommended place includes:
based on the shared information, collecting selection information on one recommended place selected in each of the multiple vehicles; and
based on the collected selection information, selecting, as the recommended place, one recommended place selected in a number of vehicles among the multiple vehicles.

13. The method of claim 11, further comprising, when the recommended place is selected, transferring information on the selected recommended place to each of the multiple vehicles.

14. The method of claim 11, wherein providing the additional service includes controlling the selected recommended place to be configured as a destination in each of the multiple vehicles, or, when there is a preconfigured desti-
nation, controlling the selected recommended place to be
configured as a waypoint.

15. The method of claim 11, further comprising, while
providing the additional service to each of the multiple
vehicles, controlling information on the additional service to
be output visually or audibly in each of the multiple
vehicles.

16. The method of claim 15, wherein controlling the
information on the additional service to be output includes
controlling the information on the additional service to be
output via the respective display device provided in each of
the multiple vehicles.

17. The method of claim 11, wherein providing the
additional service includes, when the multiple vehicles use
a payment service included in the additional service, con-
trolling payment information, related to an in-vehicle pay-
ment function associated with the payment service, to be
transmitted from at least one vehicle equipped with the
in-vehicle payment function among the multiple vehicles to
remaining vehicles among the multiple vehicles.

* * * * *

12